United States Patent
Kawaai et al.

(10) Patent No.: US 6,915,063 B2
(45) Date of Patent: Jul. 5, 2005

(54) ROD INTEGRATOR MANUFACTURING METHOD AND ROD INTEGRATOR

(75) Inventors: Satoru Kawaai, Saitama (JP); Koji Ohgaki, Saitama (JP)

(73) Assignee: Fujinon Corporation, Saitama (JP)

( * ) Notice: Subject to any disclaimer, the term of this patent is extended or adjusted under 35 U.S.C. 154(b) by 167 days.

(21) Appl. No.: 10/628,247

(22) Filed: Jul. 29, 2003

(65) Prior Publication Data

US 2004/0071434 A1 Apr. 15, 2004

(30) Foreign Application Priority Data

Jul. 29, 2002 (JP) ........................................ 2002-220026

(51) Int. Cl.[7] ................................................ G02B 6/10
(52) U.S. Cl. ........................... 385/146; 385/31; 385/36; 385/38; 385/50
(58) Field of Search ......................... 385/146, 31, 36, 385/38, 50, 115, 116

(56) References Cited

U.S. PATENT DOCUMENTS

| | | | | |
|---|---|---|---|---|
| 5,625,738 A | * | 4/1997 | Magarill | 385/146 |
| 5,777,789 A | * | 7/1998 | Chiu et al. | 359/494 |
| 5,829,858 A | * | 11/1998 | Levis et al. | 353/122 |
| 6,139,156 A | * | 10/2000 | Okamori et al. | 353/98 |
| 6,578,999 B2 | * | 6/2003 | Schmidt et al. | 362/556 |
| 2002/0114573 A1 | * | 8/2002 | Schmidt et al. | 385/46 |
| 2002/0118946 A1 | * | 8/2002 | Wagner | 385/146 |
| 2004/0126077 A1 | * | 7/2004 | Strobl et al. | 385/133 |

FOREIGN PATENT DOCUMENTS

JP    11-326727    11/1999

* cited by examiner

*Primary Examiner*—Rodney Bovernick
*Assistant Examiner*—Sung Pak
(74) *Attorney, Agent, or Firm*—Leydig, Voit & Mayer, Ltd.

(57) ABSTRACT

A rod integrator includes a quadrangular prismatic light-guiding member with a rectangular cross-sectional shape. The light-guiding member guides a light beam from a first end surface to a second end surface, opposing the first end surface, while the beam is reflected by the side surfaces so that the beam is output from the second end surface. The rod integrator includes a tube-shape body having the first open end portion tightly surrounding the end portion of the light-guiding member on the side of the second end surface, and having the second open end portion from which the beam is output while causing the beam from the first end portion to be reflected by inner mirror surfaces of the tube-shape body. The tube-shape body is arrangedy in a pinwheel shape. First, second, third, and fourth members, each of which has a plate shape and a mirror surface on one side, are arranged on the light-guiding member, such that the tube-shape body has the mirror surfaces facing inside.

8 Claims, 4 Drawing Sheets

ROD INTEGRATOR MANUFACTURING METHOD AND ROD INTEGRATOR

BACKGROUND OF THE INVENTION

1. Field of the Invention

The present invention relates to a rod integrator and the method of manufacturing the same.

2. Related Background Art

In a liquid crystal projector or the like, the beam emitted from a light source is guided into a liquid crystal panel as illumination light. Then, the beam incident into a liquid crystal panel is modulated on the basis of the image information, and the modulated beam is outputted from the liquid crystal panel. The beam from the liquid crystal panel is projected onto a screen. In such a liquid crystal projector, if the light on the surface of the liquid crystal panel is not uniform, illuminance unevenness occurs in the image on the screen. Hence a means of obtaining the uniformity of the light on the liquid crystal panel is conventionally used. A rod integrator is known as the means.

As the rod integrator, a rod prism formed from glass (Japanese Patent Laid-open No. 11-326727) or a tube-shape body having inner mirror surfaces is well known. The rod prism integrator is disclosed in Japanese Patent Laid-open No. 11-326727. The beam which is emitted from a light source is introduced directly into the first end surface or incidence end surface of the rod integrator or through the reflection on the reflector, and is guided to the second end surface or emission end surface of the rod integrator opposing the incidence end surface, which being reflected by the side surfaces of the rod integrator. As a result, the light on the emission end surface can be made substantially uniform. The emission end surface of the rod integrator and the liquid crystal panel are placed in a conjugate relationship, so that the light on the liquid crystal panel turns into uniform. The arrangement and the operations of the tube-shape integrator in a liquid crystal projector are similar to the rod prism integrator.

However, in the rod prism integrator as described above, there arise the following problems. That is, scratches or dust on the emission end surface of the rod prism integrator are imaged on the surface of the liquid crystal panel.

In the above-mentioned tube-shape integrator, there is no problem on the basis of the scratches or dust, because there is no end surface at the end portion of the tube-shape integrator from which the beam is outputted. However, there arise the problems that the quantity of light from the light source is greatly decreased through the tube-shape integrator while being reflected by inner mirror surfaces, because of the difficulty to obtain the mirror surface with 100% reflectivity.

An object of the present invention is to provide a rod integrator and a method of manufacturing of the same, which can resolve the above-described problems.

SUMMARY OF THE INVENTION

In order to achieve the above-mentioned object, the inventors have researched wholeheartedly. It has been found that, in a hybrid-type rod integrator combining a rod prism with a tube-shape body having inner mirror surfaces, dust and scratches on the emission end surface of the rod prism do not form images on the liquid crystal panel, and the decrease in the quantity of light from the light source is suppressed in comparison with a conventional rod integrator formed only from a tube-shape body.

Furthermore, the inventors have researched how to combine the rod prism with the tube-shape body to form a hybrid-type rod integrator. Thus, it has been found the method of manufacturing a rod integrator which can eliminate the effects on the screen due to gaps or the like at the junction of the rod prism and the tube-shape body.

Here, the rod integrator manufactured by the method includes a quadrangular prismatic light-guiding member with rectangular cross-sectional shape and a tube-shape body. The light guiding member has a first end surface, a second end surface on the opposite side of the first end surface, and a first side surface, a second side surface, a third side surface and a forth side surface provided between the first and second end surfaces. The light-guiding member guides the beam from the first end surface to the second end surface while causing the beam to be reflected by the side surfaces such that the beam is outputted from the second end surface. The tube-shape body has a first end portion tightly surrounding at an end of the light-guiding member on the side of the second end surface. The tube-shape body has a second open end portion from which the beam is outputted while causing the beam from the light-guiding member to be reflected by inner surfaces of the tube-shape body. The tube-shape body is arranged, in a pinwheel shape, a first member, a second member, a third member and a fourth member, each of which is in plate shape and has a mirror surface on one side. The method of manufacturing such the rod integrator is characterizing in comprising the following steps.

That is, the method is characterized in comprising a step in which one edge of the first member is disposed flush with the first side surface of the light-guiding member, and the second side surface of said light-guiding member adjacent to the first side surface is brought into contact with the mirror surface of the first member, whereby protruding the other edge of the first member from the third side surface of the light-guiding member opposing the first side surface; a step in which one edge of the second member is brought into contact with the inner surface of the first member protruding from the light-guiding member, and the mirror surface of the second member is brought into contact with the third side surface opposing the first side surface, whereby protruding the other edge of the second member from the forth side surface opposing the second side surface of the light-guiding member; a step in which one edge of the third member is brought into contact with the inner surface of the second member protruding from the light-guiding member, and the mirror surface of the third member is brought into contact with the fourth side surface opposing the second side surface of the light-guiding member; a step in which one edge of the fourth member is brought into contact with the inner surface of the third member protruding from the light-guiding member, and the mirror surface of the fourth member is brought into contact with the first side surface of the light-guiding member; and, a step in which the first member, the second member, the third member and the fourth member is fixed on the light-guiding member, respectively. Here, the beam means the bundle of rays. "Pinwheel shape", as is clear from the above manufacturing method, refers to an arranged state also called a "whorl" or "vortex" shape, with outer members protruding tangentially either clockwise or counterclockwise.

The hybrid-type rod integrator of the rod prism and the tube-shape body is manufactured by arranging tightly the first, second, third and fourth member, each of which has a mirror surface on one side, with respect to a light-guiding member (such as a rod prism) so as to form the tube-shape body such that the mirror surfaces is on the inside in the aforementioned steps. Consequently even if the sizes of individual light-guiding members are different, rod integrators can be manufactured without occurring gaps between the light-guiding member and the tube-shape body. As a result, lattice-shape unevenness in illuminance on the screen due to above-described the gaps is not occurred.

In the above-described fixing step, the first member, the second member, the third member and the fourth member are fixed on the light-guiding member using an adhesive. Further, it is preferable that the adhesive is ultraviolet curing type adhesive hardened by irradiated with ultraviolet light. When using the ultraviolet-curing type adhesive, it is possible to adjust the positions of the first, second, third and fourth member until irradiation of ultraviolet light.

The present invention also concerns a rod integrator. That is, a rod integrator of the present invention comprises a quadrangular prismatic light-guiding member with rectangular cross-sectional shape and a tube-shape body. The light-guiding member has a first end surface, a second end surface on the opposite side of the first end surface, and a first side surface, a second side surface, a third side surface and a forth side surface provided between the first and second end surfaces. Further, the light-guiding member guides the beam from the first end surface to the second end surface while causing the beam to be reflected by the side surfaces such that the beam is outputted from the second end surface. The tube-shape body has a first end portion tightly surrounding at an end portion of the light-guiding member on the side of the second end surface. Furthermore, the tube-shape body has a second open end portion from which the beam is outputted while causing the beam from the light-guiding member to be reflected by inner surfaces of the tube-shape body. The rod integrator is characterized in that the tube-shape body is arranged, in a pinwheel shape, a first member, a second member, a third member and a fourth member, each of which is in plate shape and has a mirror surface on one side, such that the tube-shape body has the mirror surfaces facing inside thereof.

With the arrangement, the beam from the light-guiding member is repeatedly reflected by inner surfaces of the tube-shape body and is outputted from the second open end portion of the tube-shape body. That is, the beam introduced into the rod integrator is outputted from the second open end portion of the tube-shape body. Because the second end portion is hollow, there is no rigid end surface on which scratches or dust may exist. Consequently, when the above-described rod integrator is applied to a liquid crystal projector, even if the second open end portion of the tube-shape body and the liquid crystal panel are in a conjugate relationship, images of dust are not formed on the liquid crystal. Further, because the rod integrator is formed combining the light-guiding member and the tube-shape body, the reduction in the quantity of light within the rod integrator can be decreased in comparison with the case in which a rod integrator is formed only from a tube-shape body. It is preferable that the above-described light-guiding member is formed from glass.

These and other features and advantages of the present invention will become apparent to those skilled in the art upon a reading of the following detailed description when taken in conjunction with the drawings wherein there is shown and described an illustrative embodiment of the invention.

DESCRIPTION OF THE PREFERRED EMBODIMENTS

In the following description, like references characters designate like of corresponding parts throughout the several views.

Figure 1:
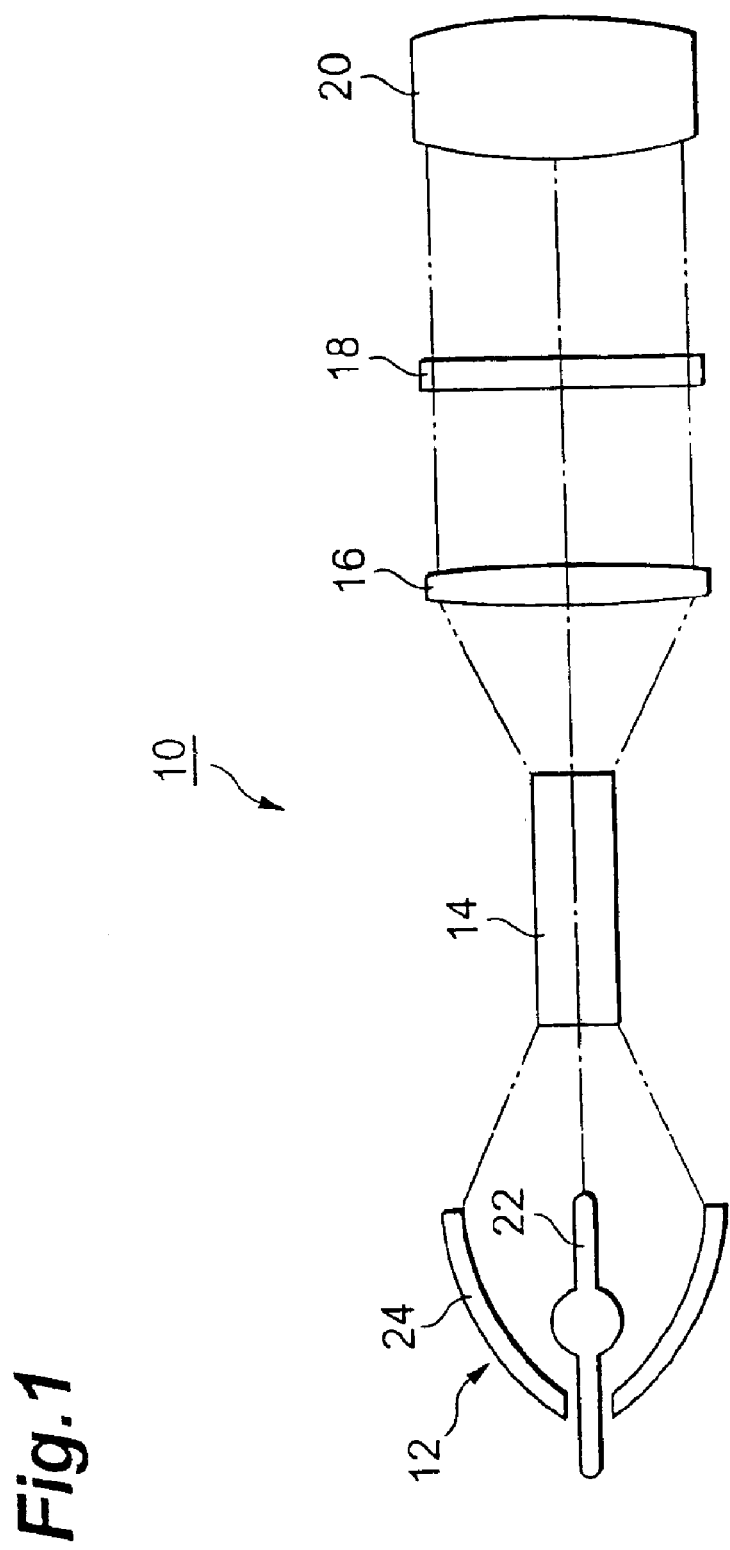
FIG. 1 is a schematic diagram showing the principle of a liquid crystal projector having a rod integrator of the present invention.

Referring now to the drawings, and particularly, to FIG. 1, there is shown the principle of a liquid crystal projector having a rod integrator of the present embodiment.

The liquid crystal projector 10 shown in FIG. 1 includes a light source part 12, a rod integrator 14, a condensing lens system 16, a liquid crystal panel 18, and a projection lens system 20.

The light source part 12 has a light source 22 and a reflector 24. The beam emitted from the light source 22 is incident onto one end of the rod integrator 14 adjacent to the light source part 12 directly, or after being reflected by the reflector 24. The beam incident onto the rod integrator 14 propagates through the rod integrator 14. Then, the beam through the rod integrator is emitted from the other end of the rod integrator 14. The emitted beam is incident onto the rod integrator 14. The incident beam is converted substantially parallel beam by the condensing lens system 16. The substantially parallel beam is made incident, as illumination light, into the liquid crystal panel 18 which can modulate the incident beam according to the image information, and the modulated beam is emitted from the liquid crystal panel 18 into the projection lens system 20. The beam which is incident into the liquid crystal panel 18 from the condensing lens system 16 and is superposed the image information by the liquid crystal panel 18 is projected on the screen (not shown) through the projection lens system 20.

In the above-mentioned liquid crystal projector 10, the end of the rod integrator 14 from which the beam is emitted and the liquid crystal panel 18 are in an optically conjugate relationship with respect to the condensing lens system 16. Also, the liquid crystal panel 18 and the screen are in an optically conjugate relationship with respect to the projection lens system 20. Therefore in order to prevent illuminance unevenness in the image on the screen, it is necessary that the light on the surface of the devise which is a main constructional element of the panel 18 is uniform. It is the above-mentioned rod integrator 14 that is the means used to provide the beam from the light source with uniformity, especially on the liquid crystal panel 18.

Figure 2:
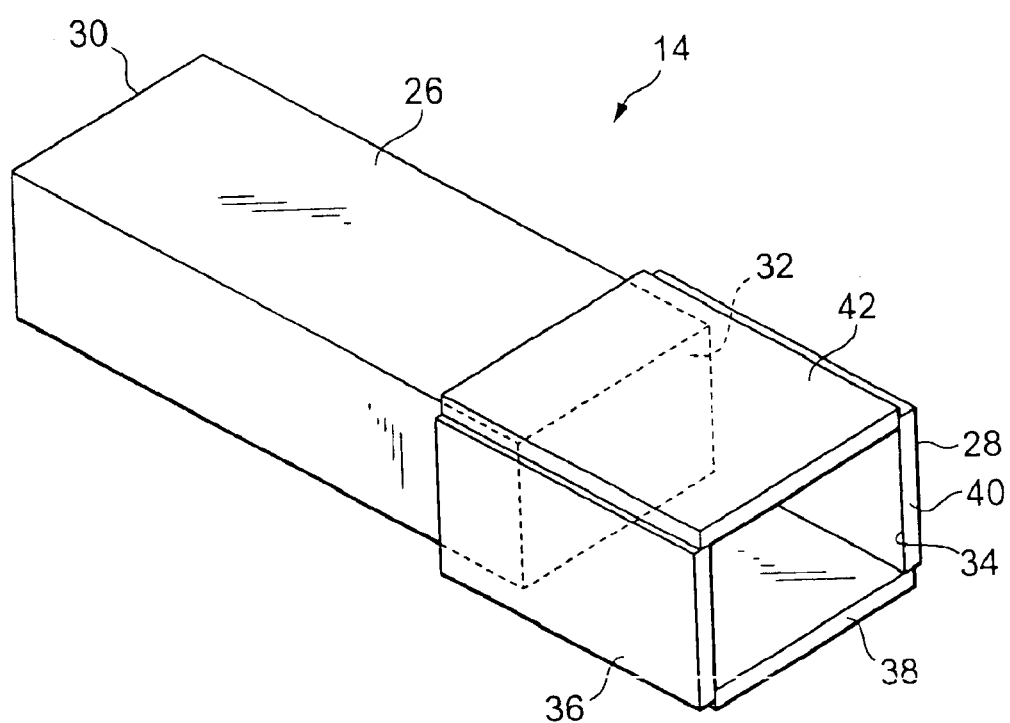
FIG. 2 is a perspective view of the rod integrator of FIG. 1.

Now, the rod integrator 14 of the present embodiment will be described. FIG. 2 shows a perspective view of the rod integrator 14. The rod integrator 14 comprises a rod prism (light-guiding member) 26 and a tube-shape body 28. The rod prism 26 is arranged adjacent to the light source part 12. The tube-shape body extends from the rod prism 12 away from the light source part 12.

The rod prism 26 is a quadrangular prism with a rectangular cross-section as shown in FIG. 2. The rod prism 26 has the first end surface 30 adjacent to the light source part 12 and the second end surface 32 on the opposite side of the first end surface 30, and has a first side surface 44, a second side surface 48, a third side surface 54 and a fourth side surface 60 provided between the first end surface 30 and the second end surface 32. It is preferable that the rod prism 26 is, for example, formed from glass. The beam from the light source part 12 is incident onto the first end surface 30 of the rod integrator 14. Then, the incident beam is propagated to the second end surface 32 while being reflected by the inner surfaces of the rod prism 26, such that the beam is emitted from the second end surface 32 into the tube-shape body 28. In order not to reduce the quantity of light from the light source part 12, the beam is made incident into the rod prism 26 in a manner such that total reflections occur on the side surfaces 44, 48, 54, 60 of the rod prism 26.

The tube-shape body 28 has the first end portion tightly surrounding the rod prism 26 on the side of the second end surface 32, and has the second open end portion 34 on the opposite side of the first end portion. The tube-shape body 28 has also inner mirror surfaces. The beam from the rod prism 26 is guided to the second open end portion 34 of the tube-shape body 28, while being reflected by the mirror surfaces of the tube-shape body 28. Then, the beam through the tube-shape body 28 is outputted from the second open end portion 34. The tube-shape body 28 has a first member 36, a second member 38, a third member 40 and a fourth member 42, each of which is in plate shape and has a mirror surface on one side, and the tube-shape body 28 is configured by arranging the members 36 to 42 in pinwheel shape tightly surrounding the end portion of the rod prism 26 on the side of the second end surface 32 such that the mirror surfaces are on the inside. As each of the members 36 to 42, for example, a glass plate having a refraction coating surface or mirror surface provided on one side thereof is preferably is used.

In the above-mentioned construction of the rod integrator 14, firstly, the beam is emitted from the light source part 12 and is introduced into the rod prism 26. The incident beam is guided to the second end surface 32 while undergoing total reflection on the side surfaces 44, 48, 54, 60 of the rod prism 14, and is emitted from the second end surface 32 into the tube-shape body 28. The beam from the rod prism 26 is repeatedly reflected by the mirror surfaces of the tube-shape body 28, and is emitted from the second open end portion 34 into the condensing lens system 16. The beam from the light source part 12 is incident onto the rod integrator 14 at various incident angles within the range of angles at which total reflection takes place on the side surfaces 44, 48, 54, 60 of the rod prism 26. Then, the beam is guided to the second open end portion 34 while being reflected within the rod integrator 14 at various reflection angles according to the incident angle onto the rod integrator 14. Because the beam reach in various directions at the second open end portion 34 of the rod integrator 14, the light at the second open end portion 34 of the tube-shape body 28 is uniform within a cross-section perpendicular to the optical axis.

The end portion of the rod integrator 14 from which the beam is outputted, that is, the second open end portion 34 of the tube-shape body 28, is hollow. Hence the end portion 34 does not have a rigid end surface on which scratches can be formed or dust can be adhered, like the second end surface 32 of the rod prism 26. So, images of dust, the scratches or the like are not formed on the liquid crystal panel 18 in a conjugate relationship with the end portion 34 and on the screen in a conjugate relationship with the liquid crystal panel 18. Further, since the rod prism 26 combine with the tube-shape body 28 to form the rod integrator 14, the reduction in the quantity of light can be decreased in comparison with that of the conventional rod integrator formed only from the tube-shape body 28.

The aforementioned rod integrator 14 of the rod prism 26 and the tube-shape body 28 may be manufactured by, for example, first forming the tube-shape body 28, and then inserting the rod prism 26 into the tube-shape body 28 and fixing in place the rod prism 26 to the tube-shape body 28. However, if the tube-shape body 28 and the rod prism 26 are combined after forming the tube-shape body 28, there arise the following problems. In the case where the plural rod integrators are manufactured, the plural rod prisms are prepared. The sizes of individual rod prisms are different due to manufacture error. If the sizes of individual rod prisms are different, the gaps may occur between the rod prism 26 and the tube-shape body 28, or it maybe impossible to insert the rod prism 26 into the tube-shape body 28, whereby the second end surface 32 of the rod prism 26 may abut one end of the tube-shape body 28.

Figure 3A:
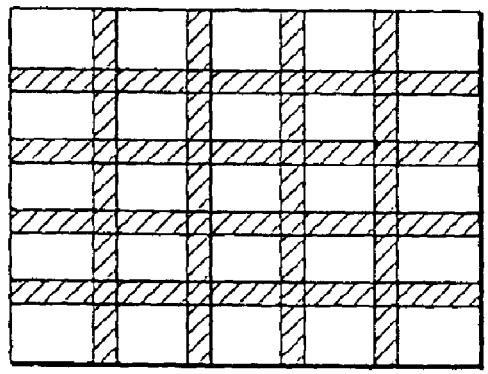
FIG. 3A shows an example of image formed by the projector where there are gaps between a rod prism and a tube-shape body.
Figure 3B:
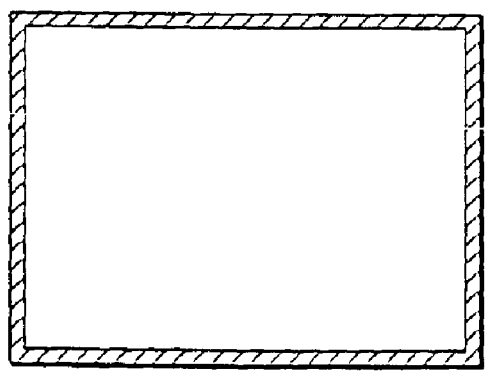
FIG. 3B shows an example of image where edge portions of the tube-shape body abut the rod prism; and, FIG. 4A shows a step of positioning the first member of the tube-shape body.

The inventors has been found the effects on the image in the case where there are the gaps between the rod prism 26 and the tube-shape body 28 and in the case where the second end surface 32 of the rod prism 26 abuts one end of the tube-shape body. That is, in the case where there are the gaps between the rod prism 26 and the tube-shape body, the gap portions appear as the dark portions on the screen. Therefore lattice-shape unevenness arises on the screen, as shown in FIG. 3A. In the case where the second end surface 32 abuts one end of the tube-shape body 28, the beam from the rod prism 26 is irregularly reflected by the contact surface between the second end surface 32 and the tube-shape body 28. As a result, chromatic unevenness occurs at edges of the image on the screen, as shown in FIG. 3B.

The rod integrator manufacturing method of the present invention can manufacture the rod integrator 14 which does not have above-mentioned problems of lattice-shape stripes and chromatic unevenness on the screen even if the sizes of individual rod prisms are different.

The method of manufacturing the rod integrator 14 will be described below referring to FIG. 4A, FIG. 4B, FIG. 4C and FIG. 4D. FIGS. 4A to 4D show steps of formation of the tube-shape body 28 when manufacturing the rod integrator 14 as shown in FIG. 2. Each of FIGS. 4A to 4D is the view seen from the side of the second open end portion 34 of the tube-shape body 28.

Figure 4A:
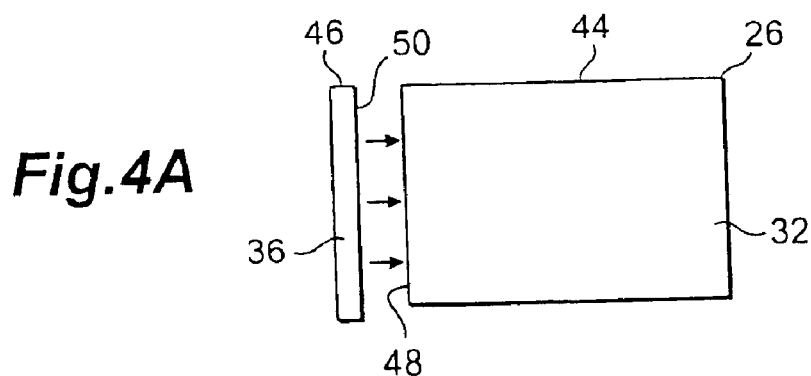
FIG. 4B shows a step of positioning the second member.
FIG. 4C shows a step of positioning the third member.
FIG. 4D shows a step of positioning the fourth member.

Referring now to FIG. 4A, the first member 36 is positioned with respect to the rod prism 26 such that one edge 46 of the first member 36 and the first side surface 44 of the rod prism 26 are in the same plane, in other words, such that the edge 46 does not protrude from the first side surface 44. In addition, the first member 36 is positioned such that the second side surface 48 of the rod prism 26 adjacent to the first side surface 44 is in contact with the mirror surface 50 of the first member 36. By positioning the first member 36 in this manner, the other edge of the first member 36 on the opposite side of the edge 46 protrudes from the third surface 54 of the rod prism 26 on the opposite side of the first side surface 44.

In positioning the first member 36 with respect to the rod prism 26 as mentioned above, an adhesive is previously applied to the contact surface of the first member 36 with the rod prism 26. Then, the first member 36 is fixed to the rod prism 26 by the adhesive applied to such contact surface. It is preferable that the adhesive has the substantially same refractive index as that of the material of the rod prism 26

(for example, glass). Additionally, it is necessary that the adhesive is optically transparent with respect to the beam from the light source part 12. Further, the ultraviolet-curing type adhesive hardened by irradiation with ultraviolet light is preferably used. By using the ultraviolet-curing type adhesive, the first member 36 can slightly slide on the rod prism 26 until irradiation with ultraviolet light to fix the first member 36 on the rod prism 26.

Figure 4B:
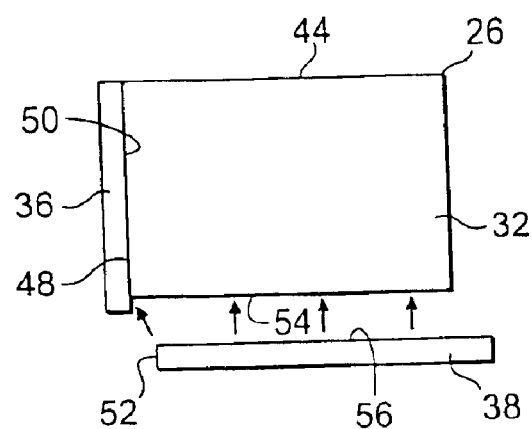

FIG. 4B shows the step of positioning of the second member 38 with respect to the rod prism 26. After fixing the first member 36 in position on the rod prism 26, the second member is positioned such that one edge 52 of the second member 38 is brought into contact with the inner surface of the first member 36 protruding from the rod prism 26. In positioning the second member 38, the mirror surface 56 of the second member 38 is brought into contact with the third side surface 54 of the rod prism 26 opposing the first side surface 44. With the above-mentioned arrangement, the other edge of the second member 38 on the opposite side of the end 52 protrudes from the forth side surface 60 of the rod prism 26 on the opposite side of the second side surface 48. In this step, the aforementioned adhesive is previously applied to the region of the side surface 52 in contact with the first member 36 and the region of the mirror surface 56 in contact with rod prism 26, and then the second member 38 is fixed on the rod prism 26 and the first member 36 respectively.

Figure 4C:
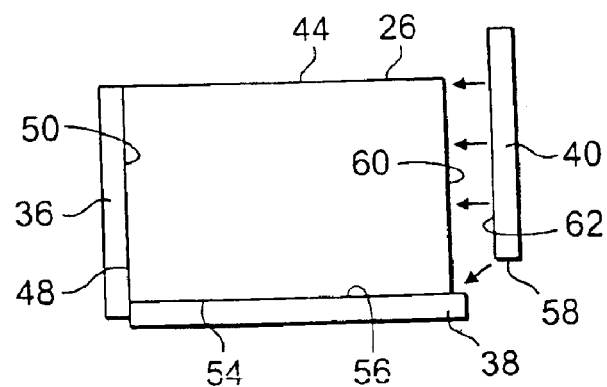

The step of positioning of the third member 40 is shown in FIG. 4C. After fixing the second member 38 on the rod prism 26, the third member 40 is fixed on the second member 38 and the rod prism 26 in the same manner in which the second member 38 is fixed on the first member 36 and the rod prism 26. That is, the third member 40 is positioned such that one edge 58 of the third member 40 is brought into contact with the inner surface of the second member 38 protruding from the rod prism 26, and such that the mirror surface 62 of the third member 40 is brought into contact with the fourth side surface 60 of the rod prism, and is fixed with the adhesive.

Figure 4D:
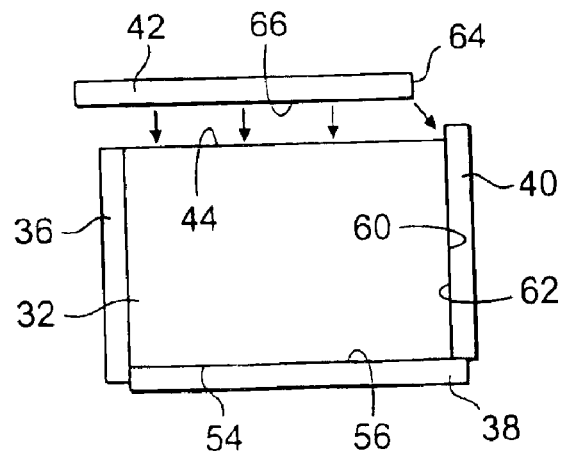

FIG. 4D shows the step following the fixing of the third member 40 on the rod prism 26. The fourth member 42 is positioned and fixed with the adhesive such that one edge 64 of the fourth member 42 is brought into contact with the inner surface of the third member 40 protruding from the rod prism 26, and such that the mirror surface 66 of the fourth member 42 and the first side surface 44 are in contact.

By the above-mentioned method, the first member 36, the second member 38, the third member 40, and the fourth member 42 can be positioned tightly on the rod prism 26 to form the tube-shape body 28, thereby manufacturing the rod integrator 14. Hence even if the sizes of individual rod prisms are different, no gaps can be formed between the rod prism 26 and the tube-shape body 28. Accordingly, lattice-shape shaded stripes, namely illuminance unevenness does not occur in the image on the screen due to gaps between the rod prism 26 and the tube-shape body 28.

Also, because the tube-shape body 28 surrounds the second end surface 32 of the rod prism 26, chromatic unevenness due to contact of the second end surface 32 with the first end of the tube-shape body 28 does not occur in the image on the screen.

Further, the rod integrator 14 formed by the above-mentioned method has the advantage relating to the fact that the second end portion 34 of the rod integrator 14 is open but not a rigid surface, as well as the advantage relating to the reduction of the quantity of light, as described previously.

As described above, the rod integrator 26 is manufactured by arranging, in pinwheel shape, the first, second, third, and fourth members 36 to 42, each of which is in plate shape and has a mirror surface on one side, on the end portion on the side of the second end surface 32 of the rod integrator 14, such that the mirror surface of each member 36 to 42 is on the inside. The tube-shape body 28 configured by arranging the first, second, third, and fourth members 36 to 42 in pinwheel shape can tightly surround the end portion of the rod prism 26 on the side of the second end surface 32 regardless of the size of the rod prism 26. Hence illuminance unevenness in the image due to gaps at the junction between the tube-shape body 28 and the rod prism 26, as well as chromatic unevenness in the image due to the abutment of one end portion of the tube-shape body 28 against the second end surface 32 of the rod prism 26 cannot occur. In the rod integrator 14 manufactured as described above, the beam is emitted from the second open end portion 34 of the tube-shape body 28. Because the end portion 34 is open or hollow, scratches are not formed on the end portion 34 and dust is not adhered on the end portion 34. Hence the images of dust or the like on the end portion from which the beam is emitted are not formed on the screen. Also, since the rod integrator 14 is formed from the rod prism 26 and the tube-shape body 28, the reduction in the quantity of light can be suppressed in comparison with the case where the rod integrator is formed from a tube-shape body alone.

In the present embodiment, whenever each of the members 36 to 42 is positioned on the rod prism 26, it is fixed to the rod prism 26. Alternatively, fixing the members 36 to 42 on the rod prism may be performed after placement of all of the members on the rod prism 26.

In the above-mentioned method of manufacturing the rod integrator 14, an adhesive is applied to the contact surfaces between each of the members 36 to 42 and the rod prism 26; fixing the members 36 to 42 on the rod prism 26 maybe performed by applying an adhesive to the joints between the adjacent pairs of the members 36 to 42 on the outer surface of the tube-shape body 28, and to the corners between the rod prism 26 and the end surfaces of each of the members 36 to 42 on the side of the first end surface 30 of the rod prism 26.

Moreover, in the present embodiment, the rod prism is used a light-guiding member. However, there is no need to use a rod prism as the light-guiding member. Any element, which can guide the incident beam from one end to the other end while causing the beam to be reflected by side surfaces such that the beam is outputted from the other end, can be used.

Although the rod integrator is applied to a transmission-type liquid crystal projector in the present embodiment, the rod integrator may be applied to a reflection-type liquid crystal projector or the like.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A method of manufacturing a rod integrator including a quadrangular prismatic light-guiding member with a rectangular cross-sectional shape, said light guiding member having a first end surface, a second end surface opposite said first end surface, and a first side surface, a second side surface, a third side surface, and a fourth side surface between said first and second end surfaces, said light-guiding member guiding a light beam from said first end surface to said second end surface, said first, second, third, and fourth side surfaces reflecting the light beam so that the light beam is output from said second end surface; and a tubular body having a first end surrounding and contacting an end of said light-guiding member said second end surface, said tubular body having a second open end portion from which the light beam is output by reflecting the light beam from inner surfaces of said tubular body, said tubular body including, in a pinwheel shape, a first member, a second member, a third member, and a fourth member, each of which has a plate shape and a mirror surface on one side, the method comprising:

disposing a first edge of said first member flush with said first side surface of said light-guiding member, bringing the second side surface of said light-guiding member adjacent to said first side surface and into contact with the mirror surface of said first member, with a second edge of said first member protruding from said third side surface of said light-guiding member, opposing said first side surface;

bringing a first edge of said second member into contact with an inner surface of said first member protruding from said light-guiding member, and bringing the mirror surface of said second member into contact with said third side surface, opposing said first side surface, with a second edge of said second member protruding from the fourth side surface, opposing said second side surface of said light-guiding member;

bringing a first edge of said third member into contact with an inner surface of said second member protruding from said light-guiding member, and bringing the mirror surface of said third member into contact with said fourth side surface, opposing said second side surface, of said light-guiding member;

bringing a first edge of said fourth member into contact with an inner surface of said third member protruding from said light-guiding member, and bringing the mirror surface of said fourth member into contact with said first side surface of said light-guiding member; and, fixing said first member, said second member, said third member, and said fourth member to said light-guiding member, respectively.

2. The method of manufacturing a rod integrator according to claim 1, including fixing said first member, said second member, said third member, and said fourth member on said light-guiding member using a adhesive.

3. The method of manufacturing a rod integrator according to claim 2, wherein said adhesive is an ultraviolet-curing adhesive hardening upon irradiation with ultraviolet light.

4. The method of manufacturing a rod integrator according to claim 1, wherein said light-guiding member is glass.

5. The method of manufacturing a rod integrator according to claim 1, wherein said first member, said second member, said third member, and said forth member are glass.

6. A rod integrator, comprising:

a quadrangular prismatic light-guiding member with a rectangular cross-sectional shape, said light guiding member having a first end surface, a second end surface opposite said first end surface, and a first side surface, a second side surface, a third side surface, and a fourth side surface between said first and second end surfaces, said light-guiding member guiding a light beam from said first end surface to said second end surface while reflecting the light beam from said side surfaces so that the light beam is output from said second end surface, and a tubular body having a first end portion surrounding and contacting an end portion of said light-guiding member at said second end surface, said tubular body having a second open end portion from which the light beam is output by reflecting the light beam from said light-guiding member from inner surfaces of said tubular body wherein said tubular body is arranged, in a pinwheel shape, and including a first member, a second member, a third member, and a fourth member, each of which has plate shape and a mirror surface on one side, and the mirror surfaces face inwardly in said tubular body.

7. The rod integrator according to claim 6, wherein said light-guiding member is glass.

8. The rod integrator according to claim 6, wherein said first member, said second member, said third member, and said fourth member are glass.

* * * * *